April 13, 1943.  E. C. RANEY  2,316,286
CONTROL APPARATUS
Filed Nov. 29, 1941  2 Sheets-Sheet 2
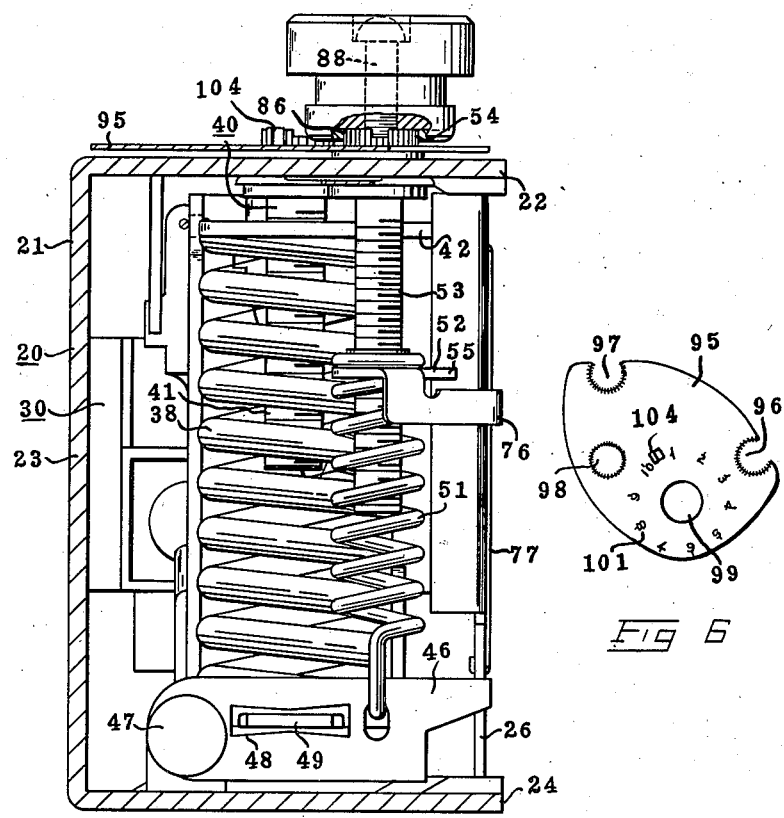
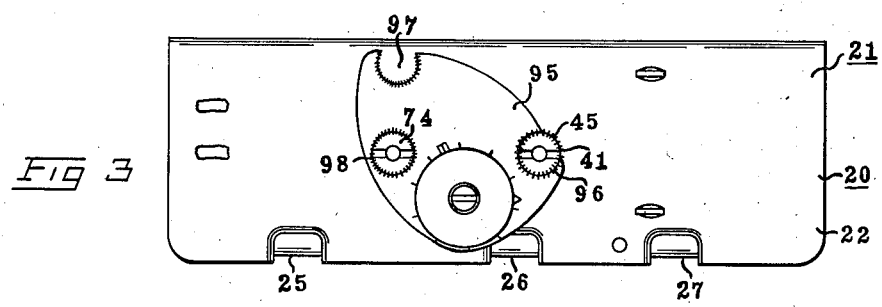
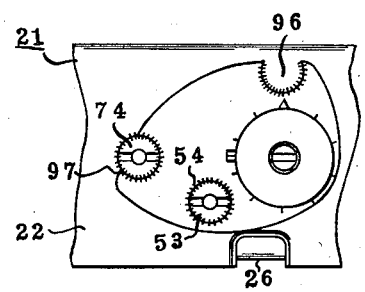
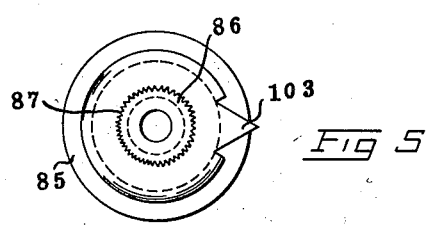
INVENTOR
ESTEL C. RANEY
BY
ATTORNEY Patented Apr. 13, 1943

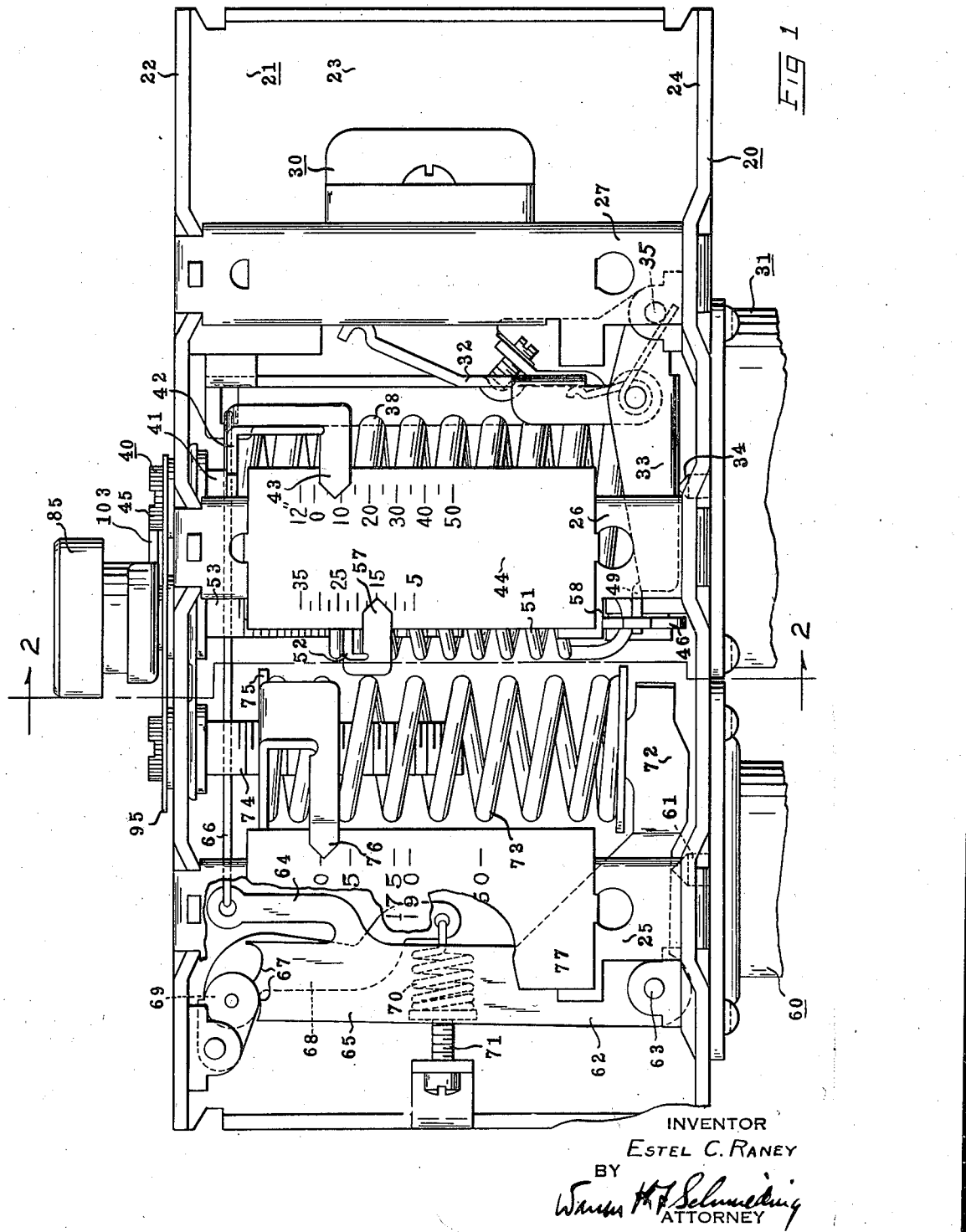

2,316,286

UNITED STATES PATENT OFFICE 2,316,286

CONTROL APPARATUS

Estel C. Raney, Columbus, Ohio, assignor to Ranco Incorporated, Columbus, Ohio, a corporation of Ohio Application November 29, 1941, Serial No. 421,085

6 Claims. (Cl. 74—483)

The present invention relates to control apparatus, and more particularly to adjusting mechanism for control apparatus.

In some types of control apparatus a plurality of rotatable adjusting elements are provided. In some instances it is desirable to adjust the apparatus by one element only while preventing unauthorized adjustment of the other while in other instances, it may be desirable to adjust the apparatus by the other of the elements only, while preventing unauthorized adjustment of the first mentioned element.

The present invention has for its object to provide a control apparatus having a plurality of adjustable elements and a member, such as a knob, by which either of the elements can be rotated, and a plate that can be attached to the apparatus for preventing rotation of one of the elements and having a portion thereof extending about a portion of another element which portion of the plate has indicia carried thereon for indicating adjustment of the adjacent element by the knob, the knob carrying a pointer. This arrangement permits any one of the elements to be adjusted by the knob while the other of the elements is locked from rotation by the plate.

Other objects and advantages will be apparent from the following description, reference being had to the accompanying drawings wherein a preferred form of embodiment of the present invention is clearly shown.

In the drawings:

Fig. 1 is a side view of a control apparatus, certain parts of the apparatus being broken away or removed for more clearly showing other parts;

Fig. 2 is a view in section taken substantially on line 2—2 of Fig. 1;

Fig. 3 is a top plan view of the control apparatus, the apparatus being shown on a smaller scale;

Fig. 4 is a fragmentary top view of the control apparatus showing certain parts of the apparatus in different positions than in Fig. 3;

Fig. 5 is a bottom view of an adjusting knob; and,

Fig. 6 is a top view of a plate, which plate may be associated with certain parts of the control mechanism.

Referring to the drawings, for the purpose of illustrating the invention, I have shown a control apparatus 20. The control apparatus 20 is particularly suitable for controlling an electric motor of a mechanical refrigerating system, although the invention could be embodied in many different types of apparatus.

In the embodiment shown, the control apparatus 20 comprises a channel shaped housing member or frame 21 that forms a top wall 22, a side wall 23 and a bottom wall 24. The top and bottom walls are interconnected at the open side of the frame by channel shaped struts 25, 26 and 27.

A snap acting switch mechanism, indicated generally at 30, is supported by the frame. Any suitable type of switching mechanism can be employed, and since there are many suitable types that are well known, the details of the switch are not shown. The switching mechanism controls the circuit of the electric motor of a refrigerating system, which system is not shown.

The switching mechanism is operated by a pressure responsive device indicated generally at 31, through a crank member formed by levers 32 and 33. The device 31 is similar to those well known in the art; it comprises a bellows member mounted in a casing, which casing is attached to the bottom wall 24 of the frame. Preferably, the bellows is arranged to expand and contract according to changes in pressure within the casing in which it is inclosed, and the movable wall of the bellows carries a pin 34 that engages the lever 33. The interior of the casing can be connected with a low pressre side of the refrigerating system so that the pressure within the casing will vary according to variations in temperature in the evaporator of the refrigerating system. It is to be understood, however, that similar results could be had by connecting the interior of the casing with a bulb, disposed in heat exchange relation with the evaporator and containing a thermal responsive fluid. When the pressure within the casing increases, the bellows moves the lever 33 clockwise about its pivot 35. The lever 32 being pivoted on the lever 33, is also moved clockwise and actuates the switching mechanism 30 to closed position. When the pressure within the casing 31 decreases, the levers 32 and 33 are rotated counterclockwise for causing opening of the switching mechanism.

A coil spring 38 is provided for continually biasing the lever 33 clockwise. The tension of this spring upon the lever 33 influences the temperatures at which the device 31 will cause the switch mechanism to be operated.

The tension of the spring 38 can be adjusted by a mechanism 40. This mechanism comprises a shaft 41 that is mounted for rotation in an opening in the top wall 22 of the frame 21. The shaft is threaded, and a plate 42 is threaded thereon, which plate engages the upper end of the spring 38. The plate 42 is provided with a forked portion, not shown, that straddles an inwardly extending flange of the strut 26 for preventing rotation of the plate. The upper end of the shaft 41 extends above the top wall of the frame 20 and the end portion thereof is serrated or notched, as indicated at 45, for receiving a handle, which handle is described hereinafter. Thus, by rotating the shaft, the plate increases or decreases the compression of the spring for raising or lowering the temperature range at which the switch operates. Preferably, the plate 42 is provided with a pointer 43, which pointer coacts with indicia on a plate 44 for indicating the adjustment of the spring 38. The plate 44 is attached to the strut 26.

Preferably, mechanism is provided for adjusting the apparatus 20 so that the pressure at which the switching mechanism 30 is opened can be controlled without affecting the pressures at which it is closed. This is known as the "differential" adjustment. This adjusting mechanism comprises a lever 46 pivoted at 47. The lever is slotted at 48 and a tongue 49, formed on the lever 33 is extended through the slot. The tongue fits loosely in the slot for forming a lost motion connection between levers 33 and 46. A tension spring 51 is attached to the lever 46 for continually biasing the lever upwardly. The upper end of the spring 51 is attached to a plate 52, which plate is threaded on a shaft 53 that is rotatably mounted on an opening in the top wall 22 of the frame 21. The periphery of the upper end portion of the shaft 53 is toothed or serrated at 54 for receiving the handle mentioned hereinbefore. The plate 52 is provided with a forked portion 55, which portion straddles an inwardly extending flange 56 of the strut 26 for preventing rotation of the plate with the shaft. It is apparent that by rotating the shaft 53, the tension of the spring can be adjusted. Preferably, a pointer 57 is formed on the plate 52, which pointer cooperates with indicia on the plate 44 for indicating the adjustment of the spring 51.

The free end of the lever 46 is engageable with a stop 58 for limiting upward movement of the lever by the spring and the width of the slot 48 in the lever 46 is such that the tongue 49 can move in the slot after the lever 46 engages the stop 58. During movement of the lever 33 toward switch closing position, the lever 46 exerts a lifting force on the lever 33 through the tongue 49, until the lever 46 engages the stop 58 and continued movement of lever 33 causes the switch to be closed. As the lever 33 moves downwardly for causing opening of the switching mechanism 30, the tongue 49 of the lever 33 engages the lower wall of the slot 48 in the lever 46 and the tension of the spring 51 then counteracts the action of the spring 38. It is apparent that the resultant of the spring 38. It is apparent that the resultant pressure upon the lever 33 urging the lever in the switch opening direction can be adjusted by adjusting the spring 51 and that the pressure at which the switching mechanism is closed can be controlled by adjusting the spring 38.

Preferably, the control apparatus 20 includes mechanism for opening the switching mechanism, should the pressure in the high side of the system become excessive, regardless of the temperature of the evaporator. In the present embodiment, this mechanism includes a pressure responsive device 60 that is similar to the device 31. The device 60 is connected with the high pressure side of the refrigeration system and is connected with a crank lever 62, which is pivoted at 63, through a pin 61. A branch 64 is formed on the arm 65 of the crank lever 62, and a Bowden wire 66 interconnects the branch 64 and the lever 32 so that when the bell crank lever 62 is rotated counterclockwise, as viewed in Fig. 1, the lever 32 will be moved to the switch open position by wire 66. The wire 66 is connected to the lever 32 by a slotted connection so that while the bell crank lever 62 is in the position shown in Fig. 1, the lever 32 can operate the switch mechanism without interference of the wire.

Preferably, mechanism is provided for causing the crank lever 62 to move with a snap action. The upper end edge of the arm 65 is shaped to form two dwells 67. A lever 68, pivoted to the top wall 22 of the frame 21, carries a roller 69. The roller 69 is urged against the end edge of the arm 65 by a tension spring 70 through the lever 68. The tension of the spring can be adjusted by a screw 71. The spring pressed roller tends to maintain the crank 62 in one or the other of two positions, and when the arm 65 of the crank lever is moved, the roller, in shifting from one dwell to the other, imparts a snap movement to the crank lever.

The laterally extending arm 72 of the bell crank lever is loaded by a coil spring 73 and the tension of the spring 73 is adjustable by a threaded shaft 74 that is mounted for rotation in an opening in the top wall 22 of the frame. A plate 75 is threaded on the shaft and engages the top of the spring. The plate 75 is provided with a forked portion, not shown, which straddles an inwardly extending flange of the strut 25 for preventing rotation of the plate with the shaft. The periphery of the upper end of the shaft 74 is toothed similarly to the peripheries of the upper ends of the shafts 41 and 53. It is apparent that by rotating the shaft 74, the tension of the spring 73 on the arm 72 of the bell crank can be adjusted for controlling the pressure at which the device 60 will actuate the crank lever 62 for opening the switch mechanism. Preferably, the plate 75 is provided with a pointer 76 that cooperates with an indicia carrying plate 77, which plate is mounted on the strut 25.

The device 61 can be connected to the high pressure side of the refrigerating system and when the pressure in the high side reaches a predetermined amount, the crank lever 62 will be rotated counterclockwise with a snap action and open the switching mechanism. The pressure at which the switching mechanism is opened can be adjusted by varying the tension of the spring 73. When the pressure in the high side of the refrigerating system decreases to a safe operating pressure, the crank lever 62 is moved clockwise for permitting normal operation of the switching mechanism.

Preferably, a suitable cover, not shown, is provided for closing the open ends and side of the frame 21. The cover may have windows in registration with the indicia carrying plates 44 and 77.

In some refrigerating systems, in which the control apparatus is installed, it is desirable to maintain the switch closing temperatures constant and provide means so that the user of the system can regulate only the temperatures at which the switch mechanism 30 is caused to be opened. In other installations it is desirable to provide means so that the user can control the range of temperatures at which the switching mechanism is operated while maintaining the "differential" at which the switch is operated constant. In order that the same control apparatus can be used in either type of installations, I have provided a knob 85 that can be used to rotate either of the shafts 41, 53 or 74. A socket 86 is formed in the bottom portion of the knob and the walls forming the socket are toothed or serrated as at 87, which serrations are arranged to engage with the serrations of the shafts for interlocking the knob and shafts in driving relation. The knob can be attached to any of the shafts by a screw 88 extending through an opening through the knob and threaded in axial openings in the shafts. Thus, the knob can be secured to any one of the shafts.

For preventing unauthorized adjustments of certain of the shafts, and for providing indicia for indicating the adjustments of the shafts by the knob 85, a plate 95 is provided. The plate has arcuate shaped opening 96 and 97, the edges forming the openings being toothed or serrated similarly to the walls of the socket 86 of the knob 85. The radii of the arc shaped openings are such that the openings are adapted to surround a portion of the shafts and the serrations thereof interlock the plate with the shafts. The plate 95 also has circular openings 98 and 99. The edges forming the opening 98 are toothed and the diameter of the opening is such that the latter teeth interlock with the serrated portions of the shafts when the shafts are extended through the opening. The diameter of the opening 99 is greater than the diameters of the toothed portions of the shafts so that any shaft extending through the opening can be rotated freely.

The shafts 41 and 74 are located so that the centers thereof are equal distances from the center of shaft 53. The openings in the plate 95 are arranged so that by causing the shaft 53 to extend through the opening 99 in the plate, the shaft 74 will extend through the opening 98 and shaft 41 will extend in opening 96, as shown in Fig. 3, and by shifting the plate so that the shaft 41 is caused to be extended through opening 99, shaft 74 will extend in opening 97, and shaft 53 will extend in opening 98, as shown in Fig. 4. It is apparent that when the plate is in the position shown in Fig. 3, shaft 53 is free to be rotated, and the knob 85 can be mounted on the shaft for adjusting the control apparatus for varying the temperatures at which the switch 30 is opened. The shafts 41 and 74 are locked from rotation by the intermeshing of the serrations of the edges forming the openings through which they extend and the serrations on the shafts. Likewise, when the plate 95 is in the position shown in Fig. 4, the shaft 41 can be rotated by the knob for varying the temperature range at which the switch is operated and the shafts 53 and 74 are locked from rotation. It is apparent that the plate is prevented from rotating by the shafts extending in the serrated openings. Thus, when the control apparatus is installed, the plate 95 can be mounted for providing ready adjustment of one or the other of the shafts 41 or 53, depending upon the position of the plate, and the other shafts are locked against unauthorized adjustments.

Preferably, the plate is provided with indicia 101 formed about opening 99 and the knob 85 is provided with a pointer 103 for cooperating with the indicia. Also, a lug 104 is struck upwardly from the plate for forming a stop. The pointer engages the lug for limiting rotation of the knob. The indicia 101 is provided so that in the event that the control apparatus is mounted where the indicia plate 44 is not visible, the indicia 101 can be utilized for indicating the adjustments.

By my invention, I have provided mechanism whereby a control apparatus or the like can be used for controlling various systems utilizing different adjustments.

While the form of embodiment of the present invention as herein disclosed constitutes a preferred form, it is to be understood that other forms might be adopted, all coming within the scope of the claims which follow.

I claim:

1. In combination, mechanism having two rotatable elements; a handle member; means on each of said elements for cooperating with a portion of the handle for interlocking the handle in driving relation with the elements; a plate, said plate having an edge portion extending about a portion of one of said elements and an edge portion extending about a portion of the other of said elements; and means on the plate at one of said edge portions for cooperating with the first mentioned means on the element adjacent said one edge portion for interlocking the latter element and plate.

2. In combination, mechanism having two rotatable elements; a handle member; means on each of said elements for cooperating with a portion of the handle for interlocking the handle in driving relation with the elements; a plate, said plate having an edge portion extending about a portion of one of said elements and an edge portion extending about a portion of the other of said elements; means on the plate at one of said edge portions for cooperating with the first mentioned means on the element adjacent said one edge portion for interlocking the latter element and plate; and means for preventing rotation of the plate about the axis of said latter element.

3. In combination, mechanism having two rotatable elements; a handle member; means on each of said elements for cooperating with a portion of the handle for interlocking the handle in driving relation with the elements; a plate, said plate having one edge portion thereof extending adjacent a portion of one of said elements and another edge portion extending adjacent a portion of the other of said elements; means on the plate at said one edge portion for cooperating with the first mentioned means on the element extending adjacent said one edge portion for interlocking the latter element and plate; indicia means on the plate associated with the other of said edge portions of the plate; and a pointer carried by said handle for cooperating with the indicia means.

4. Control mechanism comprising in combination, a casing; two rotatable elements extending through a wall of the casing; said elements having serrations about the periphery thereof; a handle member having an opening for receiving the serrated portions of the elements, the walls forming said opening having serrations for meshing with the serrations of the elements; and a plate, said plate having two openings into which the elements extend, said plate having notches formed therein about the edges forming one of said openings, the projections formed by said notches engaging the serrations on the element extending in said one opening for interlocking said element and plate, said other element being free to rotate in the other of said openings in the plate.

5. Control mechanism comprising in combination, a casing; two rotatable elements extending through a wall of the casing, said elements having serrations about the periphery thereof; a handle member having an opening for receiving the serrated portions of the elements, the walls forming said opening having serrations for meshing with the serrations on the elements; a plate, said plate having two openings into which the elements extend, said plate having notches formed therein about the edges of one of said openings, the projections formed by said notches engaging the serrations on the element extending through said one opening for locking said element against rotation, the other of said elements being rotatable; indicia means formed on the plate about the other of said openings; and a pointer movable by said handle for cooperating with said indicia means when the handle is attached to said other element.

6. Control mechanism comprising in combination, a casing; two rotatable elements extending through a wall of the casing, said elements having serrations formed about the periphery thereof; a handle member having an opening for receiving the serrated portions of the elements, the walls forming said opening having serrations for meshing with the serrations on the elements; a plate, said plate having a plurality of openings, said openings being adapted to receive said elements, said plate having notches formed therein about the edges of one of said openings, the projections formed by said notches engaging the serrations on the element extending through said one opening for locking said element against rotation, said elements being freely rotatable when extended in another of said openings; and a member extending from said wall and in one of said plurality of openings, said member cooperating with the walls forming the last mentioned opening for preventing rotation of the plate.

ESTEL C. RANEY.